(12) United States Patent
Huang

(10) Patent No.: US 9,693,359 B2
(45) Date of Patent: Jun. 27, 2017

(54) SCHEDULING COMMUNICATION RESOURCES

(71) Applicant: Empire Technology Development LLC, Wilmington, DE (US)

(72) Inventor: Anpeng Huang, Beijing (CN)

(73) Assignee: BEIJING JINDIANCHUANGQI TECHNOLOGY DEVELOPMENT CO., LTD., Beijing (CN)

( * ) Notice: Subject to any disclaimer, the term of this patent is extended or adjusted under 35 U.S.C. 154(b) by 49 days.

(21) Appl. No.: 14/357,867

(22) PCT Filed: Feb. 25, 2013

(86) PCT No.: PCT/CN2013/071828
§ 371 (c)(1),
(2) Date: May 13, 2014

(87) PCT Pub. No.: WO2014/127539
PCT Pub. Date: Aug. 28, 2014

(65) Prior Publication Data
US 2015/0282187 A1    Oct. 1, 2015

(51) Int. Cl.
H04W 72/10    (2009.01)
H04W 72/08    (2009.01)
H04W 72/12    (2009.01)

(52) U.S. Cl.
CPC ..... H04W 72/082 (2013.01); H04W 72/1226 (2013.01); H04W 72/1268 (2013.01)

(58) Field of Classification Search
CPC .......... H04W 72/082; H04W 72/1268
See application file for complete search history.

(56) References Cited

U.S. PATENT DOCUMENTS

| | | | |
|---|---|---|---|
| 2007/0293230 A1* | 12/2007 | Lee | H04W 72/085 455/450 |
| 2009/0245337 A1* | 10/2009 | Ramachandran | H04L 1/0025 375/224 |
| 2010/0008308 A1* | 1/2010 | Su | H04W 72/087 370/329 |
| 2013/0215784 A1* | 8/2013 | Nordstrom | H04W 72/085 370/252 |
| 2014/0071836 A1* | 3/2014 | Panchal | H04W 72/1205 370/248 |

FOREIGN PATENT DOCUMENTS

| | | | | |
|---|---|---|---|---|
| CN | 101090552 A | | 12/2007 | |
| IN | WO 2010065280 A2 * | | 6/2010 | ............ H04W 24/10 |
| WO | 2010065280 A2 | | 6/2010 | |
| WO | 2011051981 A1 | | 5/2011 | |

OTHER PUBLICATIONS

Donthi, S.N., and Metha, N.B., "Performance Analysis of User Selected Subband Channel Quality Indicator Feedback Scheme of LTE," Global Telecommunications Conference, pp. 1-6, IEEE (2010).

International Search Report with Written Opinion for International Application No. PCT/CN2013/071828 mailed on Dec. 5, 2013.

\* cited by examiner

*Primary Examiner* — Fan Ng
(74) *Attorney, Agent, or Firm* — Brundidge & Stanger, P.C.

(57) ABSTRACT

In an example embodiment, one or more scheduler of base stations may be configured to schedule physical resource blocks in considering the respective wireless communication channel quality and neighboring co-channel interferences.

11 Claims, 6 Drawing Sheets

SCHEDULING COMMUNICATION RESOURCES

CROSS-REFERENCE TO RELATED APPLICATION

The present application is a U.S National Stage filing under 35 U.S.C. §371 of International Application No. PCT/CN2013/071828, filed on Feb. 25, 2013.

TECHNICAL FIELD

The embodiments described herein pertain generally to scheduling uplink resources in a Long Term Evolution (LTE) system.

BACKGROUND

In scheduling uplink service data in a LTE system, a scheduler may select and dynamically allocate consecutive Physical Resource Block (PRB) resources to different users in view of the quality of a wireless communication channel and neighboring co-channel interference.

SUMMARY

In one example embodiment, a method may include determining an overall gain for each of a plurality of uplink physical resource blocks in a cell, prioritizing the plurality of uplink physical resource blocks based at least in part on the overall gain for each of the plurality of uplink physical resource blocks, and allocating the uplink physical resource blocks for uplink communications in the cell based on a descending order of relative priorities.

In another example embodiment, a computer-readable medium storing instructions that, when executed, may cause one or more processors to perform operations including determining a respective level of channel quality for each of a plurality of uplink physical resource blocks in a cell, determining a respective amount of co-channel interference for each of the plurality of uplink physical resource blocks in the cell, determining an overall gain for each of the plurality of uplink physical resource blocks based on the level of channel quality and the amount of co-channel interference, and prioritizing the plurality of uplink physical resource blocks based at least in part on the overall gain of each of the plurality of uplink physical resource blocks.

In yet another example embodiment, a method may include prioritizing a plurality of uplink physical resource blocks in a cell based at least in part on respective overall gains for the plurality of uplink physical resource blocks, and allocating the uplink physical resource blocks for uplink communications in the cell according to a respective priority of each of the plurality of uplink physical resource blocks.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
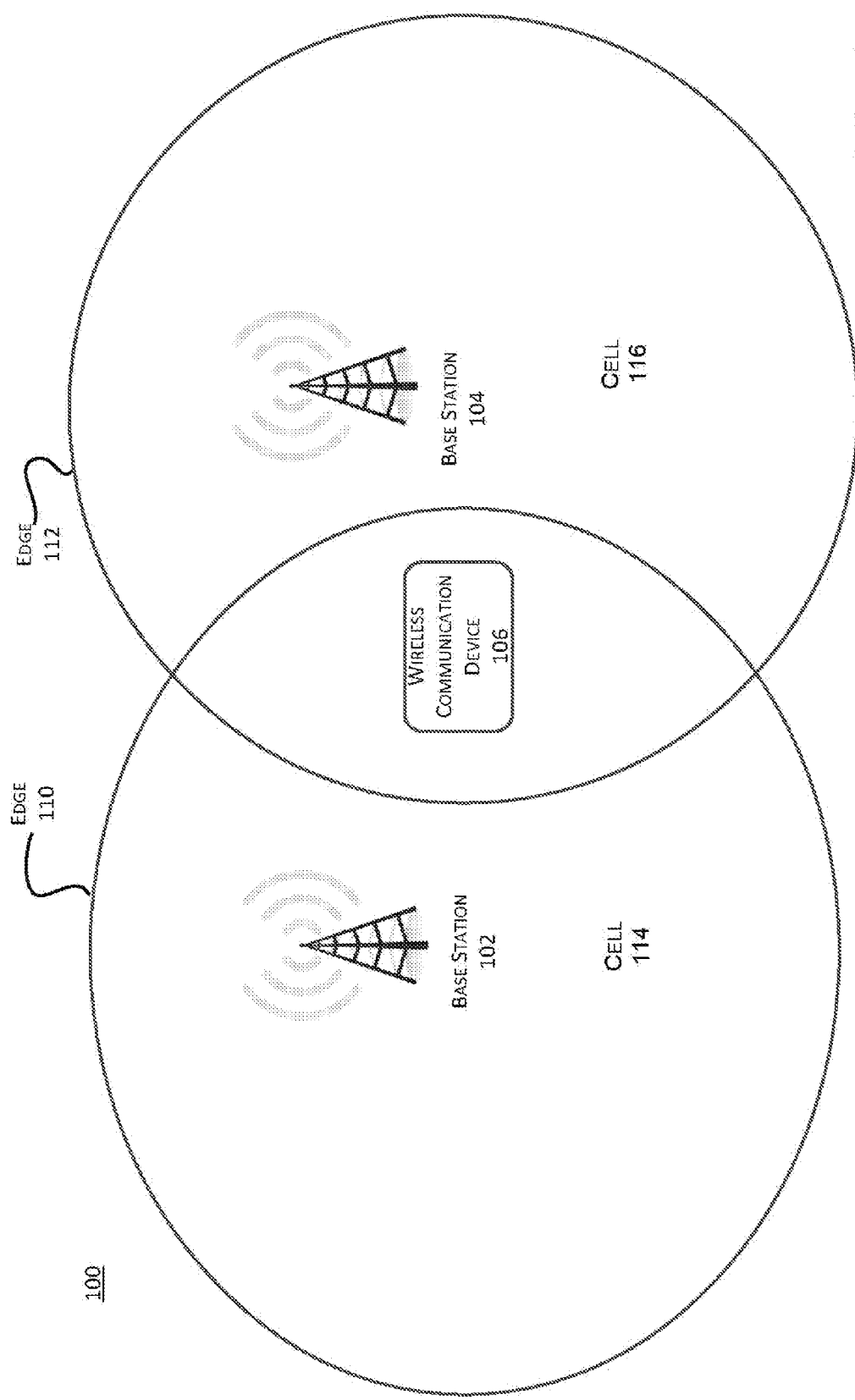
FIG. 1 shows an example wireless communication system in which one or more embodiments of scheduling communication resources may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example wireless communication system in which one or more embodiments of scheduling communication resources may be implemented, arranged in accordance with at least some embodiments described herein. As depicted, wireless communication system 100 includes, at least, a cell 114 bounded by an edge 110, a base station 102 within cell 114, a cell 116 bounded by an edge 112, a base station 104 within cell 116, and a wireless communication device 106.

Base station 102 may be installed at a fixed location or implemented as a mobile base within the boundaries of cell 114 and, similarly, base station 104 may be installed at a fixed location or implemented as a mobile base within the boundaries of cell 116. Further, base station 102 may transmit wireless signals to and from wireless communication device 106 when it is located within the boundaries marked by edge 110; and, similarly, base station 104 may transmit wireless signals to and from other wireless communication devices located within the boundaries marked by edge 112.

For example, cell 114 and cell 116 may each refer to a range of radio coverage in a respective cellular network. Cell 114 and cell 116 may each be configured, by a common entity or by separate entities, to provide wireless communication for wireless communication devices therein, and may further be equipped with base station 102 and base station 104 respectively.

Base station 102 and base station 104 may each be configured to support wireless communication between one or more wireless communication devices located within a corresponding cell, e.g., wireless communication device 106. Such communication may be in accordance with different wireless communication standards including Time Division Duplexing Long Term Evolution (TDD-LTE), Frequency Division Duplexing FDD-LTE, IEEE 802.15.4, Global System for Mobile Communications (GSM), Code Division Multiple Access (CDMA) and etc., which may further determine the work mode of the respective wireless communication devices. The work modes may include time division duplexing mode and frequency division duplexing mode. Such examples are not intended to be limiting, and therefore should not be interpreted to be so.

Edge 110 and edge 112 may each define an outer boundary of a working range of cell 114 and cell 116, respectively. Wireless communication devices within the working range of base stations 102 and 104 may reliably communicate with, i.e., transmit signals to and receive signals from, the respective base station. However, the working range may not be fixed, depending on a number of factors including, but not limited to, surrounding terrain, a frequency of signals in use, and a required data rate of the respective wireless communication devices. Further, working ranges of two adjacent cells may overlap. Thus, each of the wireless communication devices within the working range of corresponding cells may be assigned with identifiers that indicate, at least, the cell to which it belongs.

Wireless communication device 106 may refer to a mobile (or portable) electronic device such as a mobile phone, smartphone, personal digital assistant (PDA) a personal media player device, an application specific device, or a hybrid device that includes any of the above functions. Alternatively, wireless communication device 106 may be implemented as a personal computer including tablet, laptop computer, non-laptop computer configure configurations, etc. As depicted in FIG. 1, wireless communication device 106 may be located in an overlapping working range of cell 114 and cell 116 and may be configured to transmit signals to, and receive signals from, base station 102. Alternative embodiments may contemplate wireless communication device being configured to transmit signals to, and receive signals from base station 104.

In an example embodiment, wireless communication device 106 may facilitate communications utilizing Single-Carrier Frequency-Division Multiple Access (SC-FDMA) technologies. In accordance with SC-FDMA technologies, base station 102 may be configured to select and dynamically schedule different Physical Resource Blocks (PRB) to different wireless communication devices within cell 116. PRBs may represent different portions of available physical resources for the wireless communication. For example, a PRB may include a combination of portions of a frequency band and slots of a time domain. A wireless communication channel established with a given PRB has a channel quality indicator (CQI) representing a current quality of the wireless communication channel. Base station 102 may schedule the PRB with high CQI (e.g., CQI 15 in 3GPP CQI table) to improve the throughput and system efficiency of the wireless communication.

Thus, FIG. 1 shows an example wireless communication system in which one or more embodiments of scheduling communication resources may be implemented.

Figure 2:
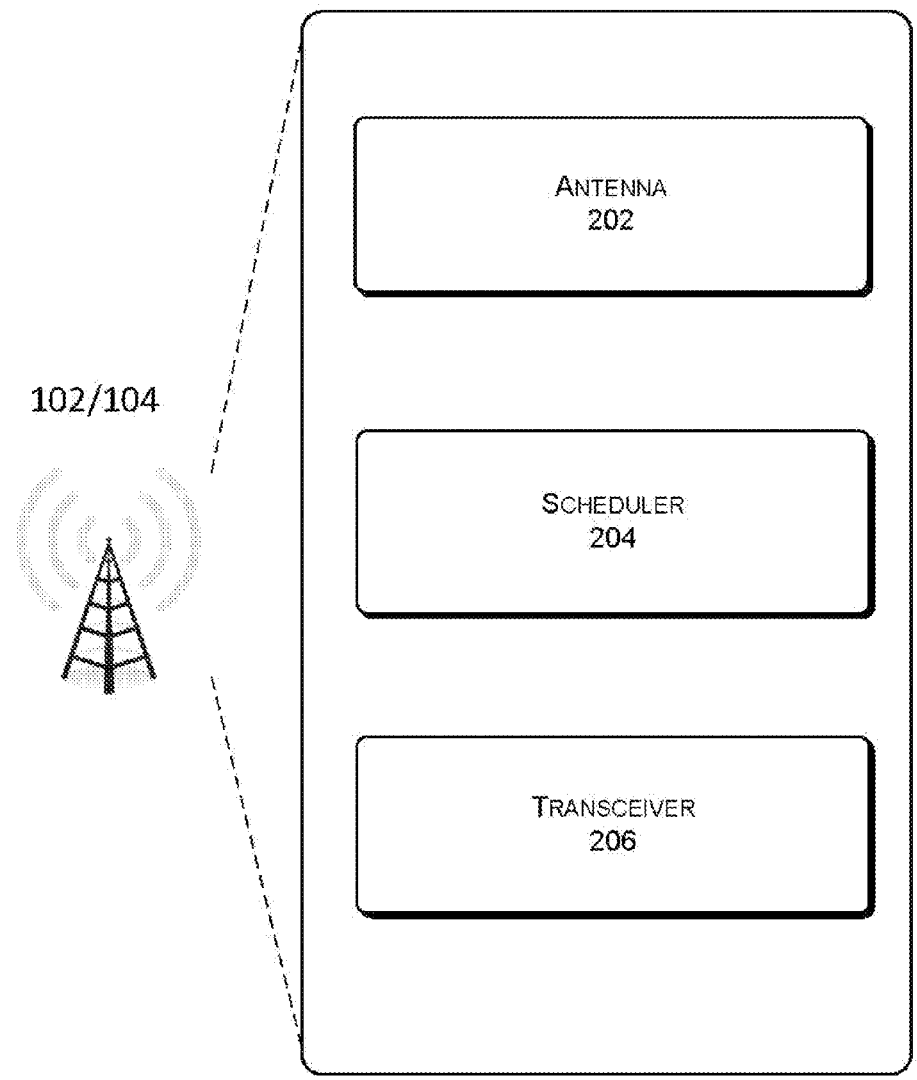
FIG. 2 shows an example base station by which one or more embodiments of scheduling communication resources may be implemented, arranged in accordance with at least some embodiments described herein.

FIG. 2 shows an example base station 102/104 by which one or more embodiments of scheduling communication resources may be implemented, arranged in accordance with at least some embodiments described herein. As depicted, the base station may refer to either base station 102 or base station 104, and therefore, unless a distinction is needed for the purpose of the description, reference may be made to "base station 102/104." As further depicted, base station 102/104 may include an antenna 202, a scheduler 204, and a transceiver 206.

Antenna 202 may refer to a component or module, implemented as software, hardware, firmware, or any combination thereof, that may be configured to convert electric power into electromagnetic waves, and vice versa, and then to transmit signals for wireless communication. When transmitting radio signals, antenna 202 may radiate energy from an oscillating radio frequency electric current as electromagnetic waves. When receiving radio signals from a communication device within a respective cell or from another base station corresponding to a different cell, antenna 202 may intercept some of the power of electromagnetic waves to produce a relatively lower voltage at its terminals, at which the intercepted power may be further amplified.

Scheduler 204 may refer to a component or module that may be configured to select and dynamically schedule different Physical Resource Blocks (PRB) for different wireless communication devices within cell 116. A PRB may represent portions of available physical resources for wireless communications facilitated by base station 102/104. For example, a PRB may refer to a combination of portions of a frequency band and slots of a time domain. A wireless communication channel established with a given PRB may have a corresponding channel quality indicator (CQI) representing the quality of the wireless communication channel. Base station 102/104 may schedule the PRB with a high CQI (e.g., CQI 15 in 3GPP CQI table) to improve the throughput and system efficiency of the wireless communication. Further, to avoid neighboring co-channel interference caused by an adjacent cell (e.g., cell 116) scheduling the same PRB to wireless communication devices within its edge, scheduler 204 may consider other factors including Received Interference Power (RIP) when scheduling PRBs.

Transceiver 206 may refer to a component or module that may be configured to, in transmission, transform digital or analog signals into a radio frequency electric current. When signals are received at base station 102/104, transceiver 206 may be configured to transform the low voltage on terminals of antenna 202 into digital or analog signals.

Thus, FIG. 2 shows an example base station by which one or more embodiments of scheduling communication resources may be implemented.

Figure 3:
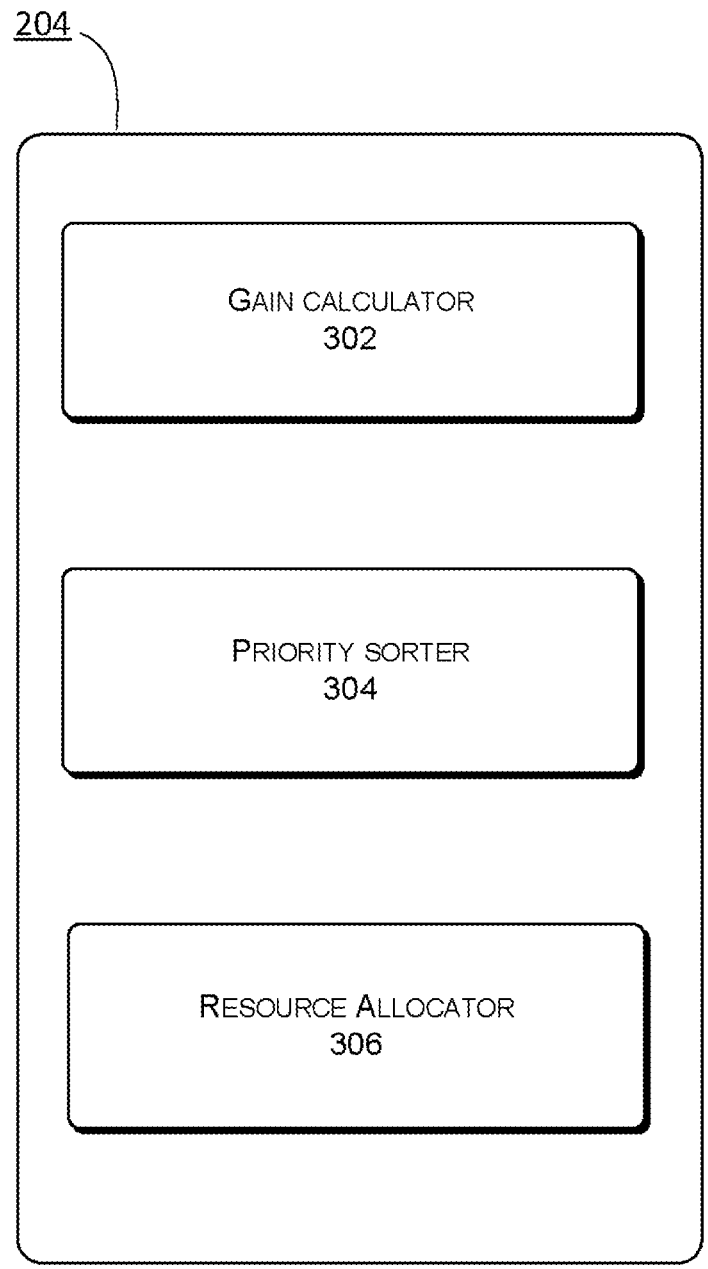
FIG. 3 shows an example scheduler by which at least portions of one or more embodiments of scheduling communication resources may be implemented, arranged in accordance with at least some embodiments described herein.

FIG. 3 shows an example scheduler 204 by which at least portions of one or more embodiments of scheduling communication resources may be implemented, arranged in accordance with at least some embodiments described herein. As depicted, scheduler 204 may include a gain calculator 302, a priority sorter 304, and a resource allocator 306. Further, as depicted, the description of scheduler 204 may refer to base station 102 and corresponding cell 114;

however, alternative embodiments may contemplate scheduler 204 being applicable to base station 104 and corresponding cell 116.

Gain calculator 302 may refer to a component or module that may be configured to determine an overall gain for each of a plurality of uplink PRBs in cell 114. In wireless communication system 100, an overall gain may be defined as a ratio of a transmitted signal to a received signal. In at least one example embodiment, an overall gain of each PRB may be related to factors including the gain contributed by the wireless communication channel quality and the gain due to neighboring co-channel interference. Neighboring co-channel interference may refer to the interference caused when an adjacent cell (e.g., cell 116) schedules the same PRB to wireless communication devices within its edge for communications implemented in both respective cells concurrently.

Gain calculator 302 may then be configured to determine a respective level of wireless communication channel quality assigned CQI value. CQI, as referenced in the present description, may refer to a measurement of the communication quality of wireless channels. A high value CQI may be indicative of a channel with high quality and vice versa. A channel deemed to be of high quality may refer a channel having low noise interference and strong signals. A CQI for a channel may be computed by making use of performance parameter, such as a signal-to-noise ratio (SNR), signal-to-interference plus noise ratio (SINR), and signal-to-noise plus distortion ratio (SNDR), which may be measured for a given channel and then used to compute a CQI for the channel. The CQI for a given channel may be dependent upon the transmission (modulation) scheme used by the communication system. For example, a wireless communication system using code-division multiple access (CDMA) may make use of a different CQI than a communication system that makes use of orthogonal frequency division multiplexing (OFDM).

Gain calculator 302 may then be configured to determine the gain of each PRB contributed by the wireless communication channel quality in accordance with the determined CQI. In accordance with at least one example embodiment, under the 3GPP TS36.213 standard, wireless communication channel quality may be divided into sixteen levels (e.g., CQI 0-15), each of which may be represented by a respective CQI and a corresponding efficiency. The gain of each respective level may be calculated as a ratio of the efficiency of the level (e.g., CQI 7) to the efficiency of a benchmark. The benchmark may refer to a level corresponding to a lowest wireless communication quality (e.g., CQI 0). As the CQI of each PRB may be measured, the gain of each respective PRB with a given CQI may be determined.

Gain calculator 302 may further be configured to determine a respective amount of neighboring co-channel interference associated with each uplink PRB in cell 114 and the gain of a respective PRB. Neighboring co-channel interference may refer to interference caused by an adjacent cell allocating the same PRB to one of the wireless communication devices therein. Neighboring co-channel interference for each uplink PRB may be indicated by Received Interference Power (RIP), which may be measured by a physical layer or a media access control (MAC) sublayer of the seven-layer Open Systems Interconnection (OSI) model of the wireless communication. The seven-layer OSI model may refer to a model standardized by International Organization for Standardization (IOS). The seven layers may include a physical layer, a data link layer, a network layer, a transport layer, a session layer, a presentation layer, and an application layer. Non-limiting examples of the physical layer may include optical fibers, wireless channels, antennas, single antennas, land cables, and corresponding processing components. A MAC sublayer may be configured to process raw data received from a corresponding physical layer. The gain due to neighboring co-channel interference of a respective PRB may then be calculated based on the difference of the RIP value of the PRB and a minimal RIP value among the PRBs measured.

Gain calculator 302 may be further configured to calculate the overall gain of each PRB. The overall gain of each PRB may refer to a difference of the gain contributed by the wireless communication channel quality and the gain due to co-channel interferences.

Priority sorter 304 may refer to a component or module that may be configured to prioritize the plurality of uplink PRBs based at least in part on the overall gain for each PRB. In accordance with at least one example embodiment, the plurality of uplink PRBs may be prioritized by overall gain in a descending order. The PRB with the highest overall gain may be sorted as the first one in the priority rank.

Resource allocator 306 may refer to a component or module that may be configured to allocate the uplink PRBs for uplink wireless communications in the cell based on a descending order of relative priorities. In accordance with at least one example embodiment, wireless communication devices establishing wireless communication with the respective cell may be allocated with PRBs on a first-in-first-out (FIFO) basis. For example, among multiple wireless communication devices within a cell, the wireless communication device that first requests a wireless communication with a corresponding base station may be allocated with the PRB with highest overall gain, among all available PRBs, to ensure the wireless communication quality between the wireless communication device and base station 102. When considering both wireless communication quality and neighboring co-channel interference when allocating PRBs, the uplink throughput and system spectrum efficiency of the wireless communication may be improved.

Thus, FIG. 3 shows an example scheduler 204 by which at least portions of one or more embodiments of scheduling communication resources may be implemented.

Figure 4:
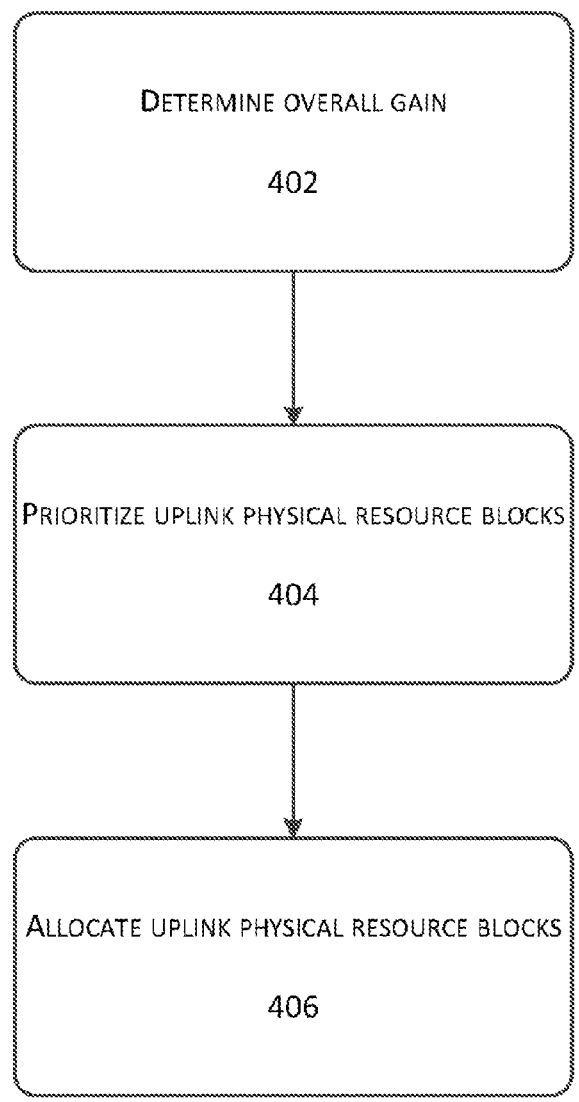
FIG. 4 shows an example configuration of a processing flow of operations for which embodiments of scheduling communication resources may be implemented, arranged in accordance with at least some embodiments described herein.

FIG. 4 shows an example configuration of a processing flow 400 of operations for which embodiments of scheduling communication resources may be implemented, arranged in accordance with at least some embodiments described herein. As depicted, processing flow 400 may include sub-processes executed by various components that are part of wireless communication system 100. However, processing flow 400 is not limited to such components, as obvious modification may be made by re-ordering two or more of the sub-processes described here, eliminating at least one of the sub-processes, adding further sub-processes, substituting components, or even having various components assuming sub-processing roles accorded to other components in the following description. Further, as depicted, the description of processing flow 400 may refer to base station 102 and corresponding cell 114; however, alternative embodiments may contemplate processing flow being applicable to base station 104 and corresponding cell 116. Processing flow 400 may include various operations, functions, or actions as illustrated by one or more of blocks 402, 404, and/or 406. Processing may begin at block 402.

Block 402 (Determine Overall Gain) may refer to gain calculator 302 determining an overall gain for each of a plurality of uplink PRBs in cell 114. The overall gain of each PRB may be related to the gain contributed by the wireless communication channel quality indicated by CQI and neighboring co-channel interference. In accordance with at least one example embodiment, gain calculator 302 may be configured to first determine the gain contributed by channel quality by calculating the difference of efficiency between different levels of wireless communication channel quality. Gain calculator 302 may then be configured to determine the gain due to neighboring co-channel interference by calculating the difference of RIPs of a respective PRB and a benchmark PRB. The benchmark PRB may refer to a PRB having the lowest RIP. In at least one example embodiment, the overall gain of each PRB may refer to a difference of the gain contributed by the wireless communication channel quality and the gain due to neighboring co-channel interference. Processing may continue from block 402 to 404.

Block 404 (Prioritize Uplink Physical Resource Blocks) may refer to priority sorter 304 prioritizing the plurality of uplink PRBs based at least in part on the overall gain for each of the plurality of uplink PRBs. In accordance with at least one example embodiment, priority sorter 304 may be configured to sort the plurality of PRBs according to the overall gain in a descending order. Processing may continue from block 404 to 406.

Block 406 (Allocate Uplink Physical Resource Blocks) may refer to resource allocator 306 allocating the uplink PRBs for uplink communication in cell 114 based on the descending order of relative priorities. In accordance with at least one example embodiment, wireless communication devices establishing wireless communication with the respective cell may be allocated with PRBs on a first-in-first-out basis. The wireless communication device that first requests a wireless communication may be allocated with the PRB with highest overall gain.

Thus, FIG. 4 shows an example configuration of a processing flow 400 of operations for which embodiments of scheduling communication resources may be implemented.

Figure 5:
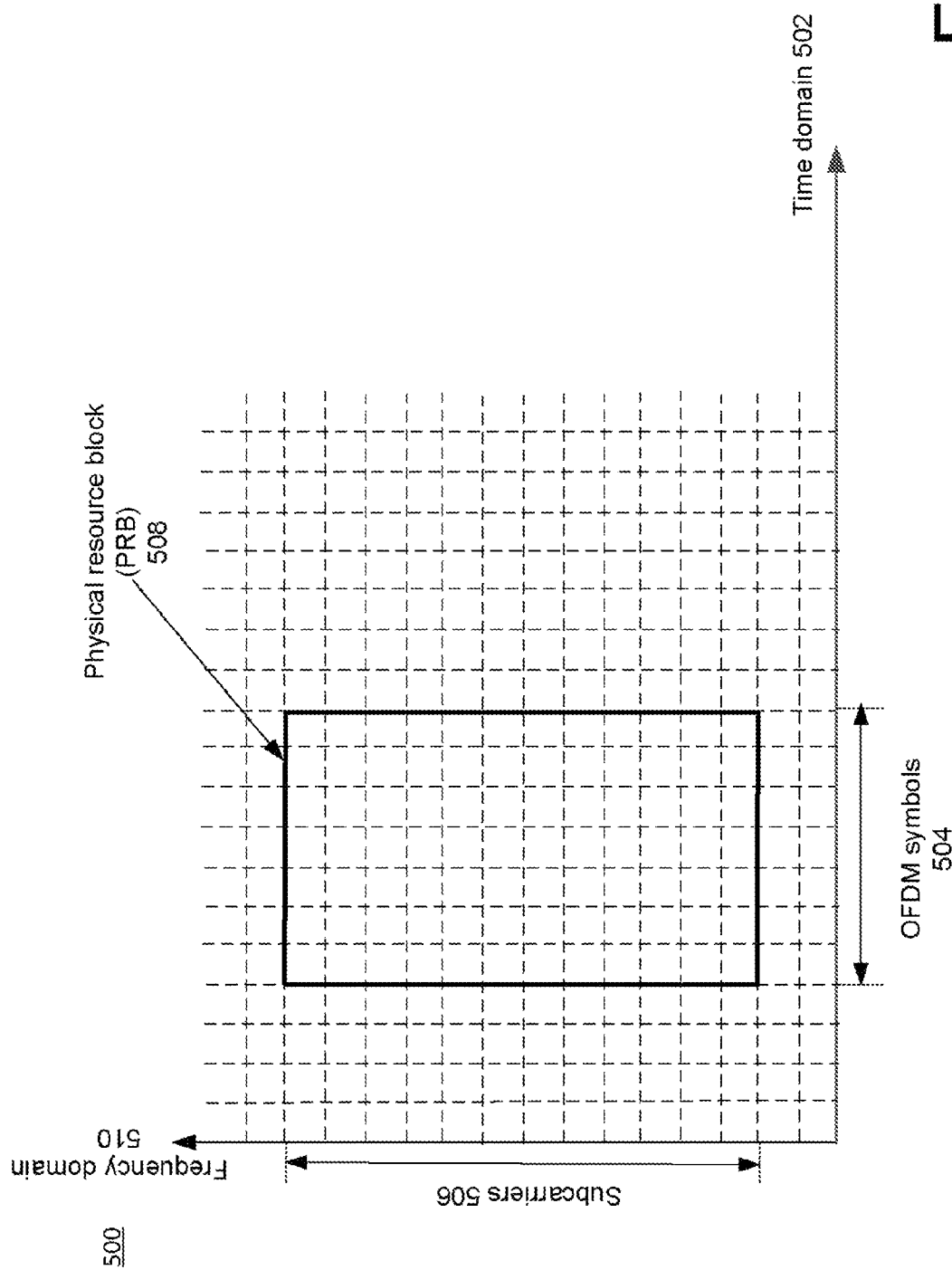
FIG. 5 shows an example communication resource in accordance with one or more embodiments of scheduling communication resources, arranged in accordance with at least some embodiments described herein.

FIG. 5 shows an example communication resource 500 in accordance with one or more embodiments of scheduling communication resources, arranged in accordance with at least some embodiments described herein. Further, as depicted, the description of communication resource 500 may refer to base station 102 and corresponding cell 114; however, alternative embodiments may contemplate communication resource 500 being applicable to base station 104 and corresponding cell 116. As depicted, example communication resource 500 includes subcarriers 506 representing portions of a frequency domain 510, OFDM symbols representing portions of a time domain 502, and a physical resource block (PRB) 508.

Frequency band 510 may refer to the bandwidth resource available to the wireless communication between wireless communication device 106 and base station 102. For example, in a GSM supported cellular network, uplink communication may be allocated with a frequency band from 890 MHz to 915 MHz. In accordance with at least one example embodiment, frequency band 510 may be divided into subcarriers 506, each of which may be allocated to a wireless communication device within cell 114, so that the wireless communication may fully utilize the bandwidth resource for multiple wireless communication devices.

Time domain 502 may refer to a period of time that the uplink communication may be implemented. In accordance with at least one example embodiment, under time-division duplexing mode, time domain 502 may be divided into several recurrent timeslots having a fixed length. OFDM symbols 504 may be transmitted over a timeslot thereof.

In accordance with at least one example embodiment, according to LTE standard, PRB 508 may refer to a combination of seven consecutive OFDM symbols in time domain 502 and 12 consecutive subcarriers in frequency domain 510. PRB 508 with other similarly constituted PRBs each may be allocated to a wireless communication within cell 114. In some cases, a wireless communication device within cell 116 may be allocated with the same PRB by cell 116 for the wireless communication. The wireless communication established via each PRB may be measured to generate a CQI to indicate the quality of the wireless communication channel. Base station 102 may schedule the PRB with a high CQI to maximize the throughput and system efficiency of the wireless communication. Further, to avoid neighboring co-channel interferences caused by cell 116 scheduling the same PRB to wireless communication devices within its edge, scheduler 204 may consider RIP in scheduling PRBs. In an example embodiment, scheduler 204 may schedule PRBs based on the overall gain of each PRB. The overall gain may refer to a difference of the gain contributed by the wireless communication channel quality and the gain due to co-channel interferences.

Thus, FIG. 5 shows an example communication resource 500 in accordance with one or more embodiments of scheduling communication resources.

Figure 6:
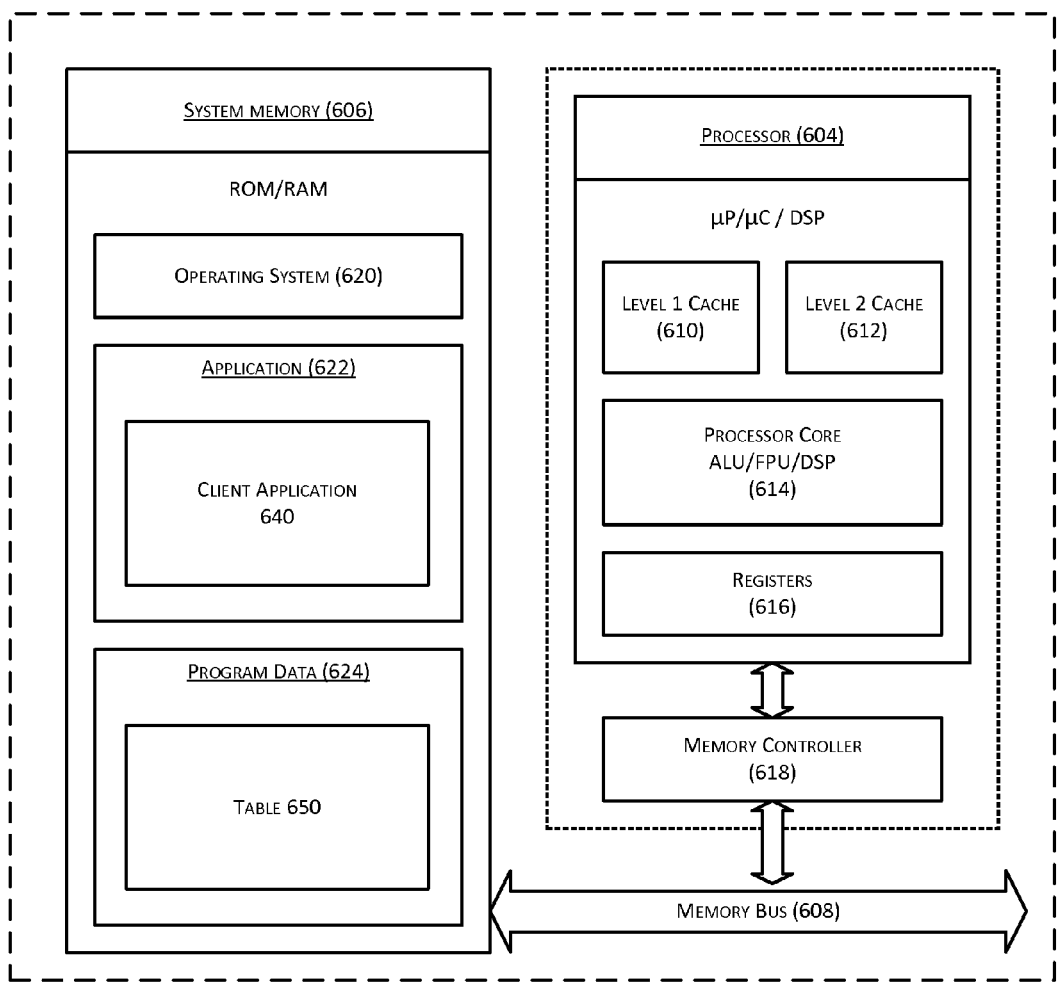
FIG. 6 shows a block diagram illustrating an example computing device by which various example solutions described herein may be implemented, arranged in accordance with at least some embodiments described herein.

FIG. 6 shows a block diagram illustrating an example computing device by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may be configured to schedule communication resources as described previously with respect to FIGS. 1-5. Program data 624 may include a table 650, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method performed under control of a base station, the method comprising:

determining, by the base station, a gain contributed by wireless communication channel quality indicated by a channel quality indicator (CQI) associated with each of a plurality of uplink physical resource blocks in a cell;

determining, by the base station, a gain due to co-channel interferences indicated by received interference power (RIP) associated with each of the plurality of uplink physical resource blocks in the cell,
  wherein the gain due to the co-channel interferences is determined by calculating a difference between a respective RIP value and a minimal RIP value among RIP values of the plurality of uplink physical resource blocks;

determining, by the base station, an overall gain by calculating a ratio of a transmitted signal to a received signal for each of the plurality of uplink physical resource blocks in the cell based on the gain contributed by the wireless communication channel quality and the gain due to the co-channel interferences;

prioritizing, by the base station, the plurality of uplink physical resource blocks based, at least in part, on the overall gain for each of the plurality of uplink physical resource blocks; and allocating, by the base station, the uplink physical resource blocks for uplink communications in the cell based on a descending order of relative priorities.

2. The method as recited in claim 1, wherein the determining the gain contributed by the wireless communication channel quality comprises:

determining, a respective level of channel quality associated with each of the plurality of uplink physical resource blocks in the cell, and wherein the determining the gain due to the co-channel interferences comprises:

determining, a respective amount of co-channel interference associated with each of the plurality of uplink physical resource blocks in the cell.

3. The method as recited in claim 1, wherein the overall gain for each of the plurality of uplink physical resource blocks comprises a difference between the respective gain contributed by the wireless communication channel quality indicated by the CQI and the respective gain due to the co-channel interferences indicated by the RIP.

4. The method as recited in claim 1, wherein the prioritizing comprises prioritizing the plurality of uplink physical resource blocks in proportion with the overall gain for each of the plurality of uplink physical resource blocks.

5. A non-transitory computer-readable medium storing instructions that, when executed, cause a base station to perform operations comprising:

determining, by the base station, a gain contributed by wireless communication channel quality indicated by a channel quality indicator (CQI) associated with each of a plurality of uplink physical resource blocks in a cell;

determining, by the base station, a gain due to co-channel interferences indicated by received interference power (RIP) associated with each of the plurality of uplink physical resource blocks in the cell,
  wherein the gain due to the co-channel interferences is determined by calculating a difference between a respective RIP value and a minimal RIP value among RIP values of the plurality of uplink physical resource blocks;

determining, by the base station, an overall gain by calculating a ratio of a transmitted signal to a received signal for each of the plurality of uplink physical resource blocks in the cell based on the gain contributed by the wireless communication channel quality and the gain due to the co-channel interferences; and prioritizing, by the base station, the plurality of uplink physical resource blocks based, at least in part, on the overall gain of each of the plurality of uplink physical resource blocks.

6. The non-transitory computer-readable medium as recited in claim 5, wherein the overall gain for each of the plurality of uplink physical resource blocks comprises a difference between the respective gain contributed by the wireless communication channel quality indicated by the CQI and the respective gain due to the co-channel interferences indicated by the RIP for each of the plurality of uplink physical resource blocks.

7. The non-transitory computer-readable medium as recited in claim 5, wherein the prioritizing comprises prioritizing the plurality of uplink physical resource blocks in proportion with the respective overall gain for each of the plurality of uplink physical resource blocks.

8. The non-transitory computer-readable medium as recited in claim 5, further comprising:

allocating the uplink physical resource blocks for uplink communications in the cell based on a descending order of relative priorities.

9. A method performed under control of a base station, the method comprising:

prioritizing, by the base station, a plurality of uplink physical resource blocks in a cell based, at least in part, on respective overall gains by calculating a ratio of a transmitted signal to a received signal for each of the plurality of uplink physical resource blocks, wherein the overall gains are calculated based on a gain contributed by wireless communication channel quality indicated by a channel quality indicator (CQI) associated with each of the plurality of uplink physical resource blocks in the cell and a gain due to co-channel interferences indicated by received interference power (RIP) associated with each of the plurality of uplink physical resource blocks in the cell, and wherein the gain due to the co-channel interferences is determined by calculating a difference between a respective RIP value and a minimal RIP value among RIP values of the plurality of uplink physical resource blocks; and allocating, by the base station, the uplink physical resource blocks for uplink communications in the cell according to a respective priority of each of the plurality of uplink physical resource blocks.

10. The method as recited in claim 9, wherein the gain contributed by the wireless communication quality is related to a level of channel quality associated with each of the plurality of uplink physical resource blocks in the cell and the gain due to the co-channel interferences is related to an amount of co-channel interference associated with each of the plurality of uplink physical resource blocks in the cell.

11. The method as recited in claim 9, wherein the respective overall gain for each of the plurality of uplink physical resource blocks comprises a difference between the gain contributed by the wireless communication channel quality indicated by the CQI and the gain due to the co-channel interferences indicated by the RIP for each of the plurality of uplink physical resource blocks.

* * * * *